(12) United States Patent
Zhou et al.

(10) Patent No.: US 11,697,142 B2
(45) Date of Patent: Jul. 11, 2023

(54) HOT AIR CIRCULATION TYPE INDIRECT THERMAL DESORPTION-BASED SOIL REMEDIATION SYSTEM AND METHOD

(71) Applicants: CSSC NANJING LUZHOU ENVIRONMENT PROTECTION CO., LTD., Jiangsu (CN); NANJING TECH UNIVERSITY, Jiangsu (CN); NANJING INSTITUTE OF ENVIRONMENTAL SECIENCES, MINISTRY OF ECOLOGY AND ENVIRONMENT OF THE PEOPLE'S REPUBLIC OF CHINA, Jiangsu (CN)

(72) Inventors: Yongxian Zhou, Nanjing (CN); Jisai Chen, Nanjing (CN); Haitao Xu, Nanjing (CN); Shengtian Zhang, Nanjing (CN); Hongqi Wang, Nanjing (CN); Qinrui Wu, Nanjing (CN); Yongliang Zhang, Nanjing (CN); Xiang Ling, Nanjing (CN)

(73) Assignees: CSSC NANJING LUZHOU ENVIRONMENT PROTECTION CO., LTD., Nanjing (CN); NANJING TECH UNIVERSITY, Nanjing (CN); NANJING INSTITUTE OF ENVIRONMENTAL SCIENCES, MINISTRY OF ECOLOGY AND ENVIRONMENT, Nanjing (CN)

( * ) Notice: Subject to any disclaimer, the term of this patent is extended or adjusted under 35 U.S.C. 154(b) by 0 days.

(21) Appl. No.: 17/545,941

(22) Filed: Dec. 8, 2021

(65) Prior Publication Data

US 2022/0176425 A1    Jun. 9, 2022

(30) Foreign Application Priority Data

Dec. 8, 2020    (CN) ......................... 202011425614.6

(51) Int. Cl.
     *B09C 1/06*      (2006.01)
(52) U.S. Cl.
     CPC .................................. *B09C 1/065* (2013.01)
(58) Field of Classification Search
     CPC ................................ B09C 1/06; B09C 1/065
(Continued)

(56) References Cited

U.S. PATENT DOCUMENTS

2022/0176423 A1\*   6/2022   Xu ............................ B09C 1/06

FOREIGN PATENT DOCUMENTS

CN      103008337 A    \*   4/2013   ........... B01D 46/023
CN      107030100 A    \*   8/2017   ........... B01D 46/023
(Continued)

*Primary Examiner* — Frederick L Lagman
(74) *Attorney, Agent, or Firm* — Oliff PLC

(57) ABSTRACT

A hot air circulation type indirect thermal desorption-based soil remediation system and method, belonging to the technical field of soil remediation. The system includes a thermal desorption reactor, a dust remover, a hot air circulating fan, a hot air heater, an air preheater, a combustion fan and a combustion device. By using thermal desorption gas generated by soil being heated and volatilized as a heat transfer medium and by a circular heating manner, hot air efficiently transfers heat to the soil by contact, and the high-temperature fume is kept from direct contact with the soil, so the system has the advantages of high treatment capacity, small equipment scale and the like.

10 Claims, 1 Drawing Sheet

(58) Field of Classification Search
USPC .......................................... 405/128.8, 128.85
See application file for complete search history.

(56) References Cited

FOREIGN PATENT DOCUMENTS

| CN | 107971330 A | * | 5/2018 | ........... B01D 46/023 |
|---|---|---|---|---|
| CN | 207723181 U | | 8/2018 | |
| CN | 109047312 A | | 12/2018 | |
| CN | 110479748 A | | 11/2019 | |
| CN | 111174619 A | | 5/2020 | |
| CN | 211953821 U | | 11/2020 | |
| CN | 112658022 A | * | 4/2021 | ............... B09C 1/06 |
| KR | 20110107996 A | * | 11/2011 | ............... B09C 1/06 |

\* cited by examiner

HOT AIR CIRCULATION TYPE INDIRECT THERMAL DESORPTION-BASED SOIL REMEDIATION SYSTEM AND METHOD

TECHNICAL FIELD

The invention belongs to the technical field of soil remediation in contaminated sites, is applicable to remediation of soil in organic contaminated sites, and particularly relates to a hot air circulation type indirect thermal desorption-based soil remediation system and method.

BACKGROUND

Soil refers to the loose surface layer with fertility and capable of growing plants on the land surface. When harmful substances discharged into the soil exceed the self-decontamination capacity of the soil, the composition, structure and functions of the soil will change. Microbial activities are inhibited, and the harmful substances or decomposition products thereof gradually accumulate in the soil and are indirectly absorbed through "soil→plant→human body" or through "soil→water→human body" to a level that harms human health, thus causing soil contamination.

At present, heavily contaminated sites mainly include chemical plants, pesticide plants, smelters, gas stations and chemical storage tanks. Main contaminants of such sites are organic contaminants, which can be divided into volatile organic compounds, semi-volatile organic compounds, persistent organic compounds, pesticides and the like according to their different melting and boiling points. Remediation techniques of such contaminated soil include incineration (cement kiln co-disposal), phytoremediation, bioremediation, chemical remediation and thermal desorption. The thermal desorption technique has the advantages of high treatment efficiency, short remediation period, movable devices, etc., and is widely used in remediation of volatile/semi-volatile organic contaminated sites. According to US EPA statistics, thermal desorption accounts for 20-30% of the site remediation cases in Europe and America, thus being one of the main site remediation techniques.

According to the thermal desorption technique, the contaminated soil is heated directly or indirectly by high-temperature fume generated by combustion to above the target temperature, and by controlling the system temperature and material residence time, the organic contaminants are selectively gasified and volatilized such that they are separated and removed from soil particles.

At present, according to different manners in which the high-temperature fume heats the soil, there are two techniques, direct thermal desorption and indirect thermal desorption.

In the direct thermal desorption technique, the high-temperature fume contacts the soil and transfers heat directly, so the transfer efficiency is high, but the high-temperature fume is mixed with the gaseous organic contaminants. Application No. CN201110201582.6 discloses a continuous method for direct thermal desorption of persistent organic contaminated soil. High-temperature fume generated by the combustion of a light oil combustor directly heats contaminated soil in a rotary thermal desorber, the high-temperature fume and the gas generated by the soil being heated enter a secondary combustion chamber through a gas outlet of the rotary thermal desorber and is pyrolyzed and combusted, and the product is discharged after deacidification, cooling and dust removal by a fume treatment device. Application No. 20190662303.8 discloses a thermal desorption system applied to soil remediation, including a pretreatment subsystem, a thermal desorption subsystem and an exhaust gas treatment subsystem. The exhaust gas treatment subsystem includes a secondary combustion chamber, a primary heat exchanger, a quench tower, a fume purifying device, a first dust remover, an induced draft fan, a secondary heat exchanger and a deacidification tower that are connected sequentially. Application No. CN201920670997.X discloses a thermal desorption-based fume purifying system applied to soil remediation, including a secondary combustion chamber, a primary heat exchanger, a quench tower, a fume purifying device, a first dust remover, an induced draft fan, a secondary heat exchanger and a deacidification tower. Exhaust gas discharged from the secondary combustion chamber is sequentially subjected to heat exchange through the primary heat exchanger, is sequentially cooled by the quench tower, purified by the fume purifying device, subjected to dust removal by the first dust remover, subjected to secondary heat exchange by the secondary heat exchanger and deacidified by the deacidification tower through the pipeline, and finally enters a chimney. All these three patents use the direct thermal desorption technique. The high-temperature fume is mixed with the gas generated by heating the soil, so the amount of offgas to be purified is large. Moreover, the large amount of offgas needs to be treated at a high temperature of 1100-1200° C. in the secondary combustion chamber, resulting in long treatment flow, large equipment scale, high energy consumption, high investment cost and high use cost. However, the contaminated soil is all over the country, and the equipment needs to be disassembled and assembled frequently to replace the use site. The amount of offgas to be purified in the existing direct thermal desorption technique is large, resulting in large equipment scale and high cost for disassembly, assembly and transportation, which has become the main factor restricting the application and popularization of the direct thermal desorption technique.

In the indirect thermal desorption technique, the high-temperature fume does not contact the soil, and transfers heat indirectly through a metal shell, so that the high-temperature fume is prevented from being mixed with the gaseous organic contaminants, which makes the amount of offgas to be purified small. Application No. CN201410474990.2 discloses an indirect thermal desorption disposal device and method of persistent organic compound contaminated soil. The device includes a contaminated soil pretreatment system, a feed system, a thermal desorption system, a discharge system, an offgas purifying system and an automatic control system. The contaminated soil pretreatment system is connected to a feed port of the thermal desorption system through the feed system, a solid discharge port of the thermal desorption system is connected to the discharge system, and a gas discharge port of the thermal desorption system is connected to an inlet of the offgas purifying system. The method includes: contaminated soil is pretreated, delivered to the thermal desorption system and subjected to desorption at 400-600° C. for 10-40 min, and the desorption exhaust gas is subjected to cyclone dust removal, two-stage spraying, drying and activated carbon adsorption/gliding arc degradation. Application No. CN201821545107.4 discloses an indirect thermal desorption device for organic contaminated soil remediation, including a feed system, a thermal desorption system, a discharge system and an exhaust gas purifying system. The thermal desorption system includes an indirect thermal desorption machine. The indirect thermal desorption machine includes a drum body. Two ends of the drum body are provided with a feed port and a solid discharge port. The feed system is hermetically connected to the feed port of the drum body, and the discharge system is hermetically connected to the solid discharge port of the drum body. A top end of the drum body is provided with a gas discharge port, and the exhaust gas purifying system is hermetically connected to the gas discharge port of the drum body. An outer wall of the drum body is sleeved with a combustion furnace, the combustion furnace is sequentially connected in series with a heat exchanger and a combustion fan through a pipeline, a fume discharge fan is connected above the combustion furnace through a pipeline, and the fume discharge fan is connected to the heat exchanger through a pipeline. These two patents both use the indirect thermal desorption technique, so the amount of offgas to be purified is small. However, the solid soil has poor fluidity, and the complex reactor structure can cause blockage and other failures. Therefore, to satisfy the convenience in disassembly and transportation, the equipment scale is limited, and the heat transfer area is small, resulting in low heat transfer efficiency. The treatment capacity of equipment is usually only about 3-4 tons per hour. However, there is often thousands or even tens of thousands of tons of soil that needs to be remediated in a contaminated site. The current treatment capacity of equipment is far from meeting the demands for remediation, and the remediation period is very long, which limits the application and popularization of the indirect thermal desorption technique.

SUMMARY

The objective of the invention can be achieved by the following technical solutions:

Provided is a hot air circulation type indirect thermal desorption-based soil remediation system. The system includes a thermal desorption reactor, a drum is disposed in an inner cavity of the thermal desorption reactor, the thermal desorption reactor is provided with two fume passages, the first fume passage is a heating system inside the drum, and the system is composed of a circulating hot air outlet of the drum, a dust remover, a hot air circulating fan, a hot air heater and a circulating hot air inlet of the drum that are connected sequentially. The second fume passage is a heating system used outside the drum, and the system is composed of a fume outlet of the thermal desorption reactor, an air preheater, a combustion fan, a combustion device, the hot air heater and a fume inlet of the thermal desorption reactor that are connected sequentially.

In some technical solutions, an outer peripheral side of the drum is provided with a heat insulation cover, an outer peripheral side of the drum is provided with a heat insulation cover, one end is provided with a feeding device and a feed end fixed hood, and the other end is provided with a discharge end fixed hood. The feeding device is provided with a raw soil inlet, the feed end fixed hood is provided with a circulating hot air outlet, the heat insulation cover is provided with a fume inlet near a discharge end, and provided with a fume outlet near a feed end, and the discharge end fixed hood is provided with a circulating hot air inlet and a treated soil outlet.

In some technical solutions, the hot air circulating fan is further provided with an output end that is connected to a condenser through a catalytic oxidation device, a cooling tower and a circulating pump are provided above the condenser, and a heat exchange process of the water in the condenser and the cooling tower is realized through the circulating pump.

In some technical solutions, an included angle between an axis of a drum body of the drum and the horizontal plane is 0-6°, or there is a guide device leaning to the discharge end inside.

Provided is a hot air circulation type indirect thermal desorption-based soil remediation method realized by using the above system. The method includes the following steps:

(1) Thermal desorption offgas generated by contaminated soil being heated inside a drum of a thermal desorption reactor serves as an initial source of circulating hot air, the hot air flows to a dust remover through a circulating hot air outlet of the drum and is subjected to dust removal and driven by a hot air circulating fan, a part of the hot air is heated to 550-650° C. by a hot air heater through indirect heat exchange, returns to the inside of the drum through a circulating hot air inlet of the drum, transfers heat to the contaminated soil by direct countercurrent contact such that the temperature drops to 380-420° C., and carries the thermal desorption offgas generated by the contaminated soil being heated, a part continues to be recycled in a hot air circulation loop, and the remaining part is discharged after being purified.

(2) Fuel is combusted in a combustion device to generate fume with a high temperature of 950-1050° C., and the fume is subjected to indirect heat exchange with the circulating hot air through the hot air heater such that the temperature drops to 700-800° C., then enters a fume channel in the reactor through a fume inlet of a heat insulation cover, is subjected to indirect heat exchange with the contaminated soil in the hot drum such that the temperature drops to about 350-450° C., then flows to an air preheater through a fume outlet of the heat insulation cover, is subjected to indirect heat exchange with air such that the temperature drops to 150-250° C., and is finally discharged to the atmosphere through a chimney. The fume does not contact the soil and the circulating hot air.

(3) Room-temperature raw soil is fed into a feed end of the drum by a feeding device, and is directly heated by the hot air inside the drum and indirectly heated by the fume outside the drum in the process of rotating along with the drum and moving toward a discharge end such that the temperature gradually rises to about 300-500° C., water and organic contaminants in the soil are volatilized into a gaseous state and carry dust to become the thermal desorption offgas that is separated from the solid soil, and the treated soil is discharged.

In the above method, the remaining part of the circulating hot air from an outlet of the hot air circulating fan passes through a catalytic oxidation device, the organic contaminants undergo thermal oxidation reaction at 380-420° C. to become carbon dioxide and water vapor, the mixture is subjected to indirect heat exchange with circulating cooling water through a condenser so as to be cooled and condensed to 55-65° C., and driven by an induced draft fan, the mixture is finally discharged to the atmosphere through an exhaust funnel.

In the above method, the room-temperature air passing through the air preheater is subjected to indirect heat exchange with the fume at the fume outlet of the heat insulation cover such that the temperature rises to 150-250° C., and is driven by a combustion fan to the combustion device to serve as combustion-supporting air for the combustion of the fuel, thereby realizing reuse of waste heat.

In the above method, clean water, serving as circulating water, is subjected to indirect heat exchange with the offgas at an outlet of the catalytic oxidation device through the condenser such that the circulating water is heated to 40-60° C., and then the circulating water is cooled to about 35° C. by a cooling tower and driven by a circulating pump to be recycled.

In the above method, with the continuous treatment of the soil, the thermal desorption offgas is generated continuously, the circulating hot air carries the thermal desorption offgas and is mixed therewith, the amount of gas increases, 65-90% of the gas in the drum serving as the circulating hot air is recycled in a first fume passage, and the remaining gas enters the catalytic oxidation device and the condenser through a branch of the outlet of the hot air circulating fan and is discharged after being purified.

In the above method, a rotating speed of the drum body is 0.4-10 r/min, and a soil filling factor in the drum body does not exceed 0.25.

In some preferred technical solutions, the hot air circulating fan and the induced draft fan adopt variable frequency control. The hot air circulating fan is adjusted according to the comparison between a measured temperature and a target temperature at a soil outlet. When the measured temperature is lower than the target temperature, the frequency increases, otherwise, it decreases. The frequencies of the induced draft fan and the hot air circulating fan are adjusted synchronously, and are finely adjusted according to the comparison between a measured gas pressure and a target pressure in the drum. When the measured gas pressure is higher than the target pressure, the frequency increases, otherwise, it decreases. By adjusting the frequencies of the fans, it is ensured that the circulating hot air and the excess gas are all evacuated, and a slight negative pressure is kept in the drum, which avoids secondary contamination caused by the escape of organic exhaust gas. At the same time, the system can be adjusted and kept stable according to the weight and water content in the treated soil as well as the required desorption temperature of the organic contaminants.

The invention has the following beneficial effects:

The invention discloses a hot air circulation type indirect thermal desorption-based soil remediation system. By using thermal desorption gas generated by soil being heated and volatilized as a heat transfer medium and by a circular heating manner, hot air efficiently transfers heat to the soil by contact, so the treatment capacity of equipment is high, and high-temperature fume is kept from direct contact with the soil, which prevents the high-temperature fume from being mixed with gaseous organic contaminants. Therefore, only a small amount of excess gas needs to be purified, so the equipment scale is small.

In the figures, 1. thermal desorption reactor, 2. dust remover, 3. hot air circulating fan, 4. hot air heater, 5. combustion device, 6. chimney, 7. catalytic oxidation device, 8. condenser, 9. induced draft fan, 10. exhaust funnel, 11. cooling tower, 12. circulating pump, 13. air preheater, 14. combustion fan, 15. feeding device, 16. feed end fixed hood, 17. heat insulation cover, 18. drum, 19. discharge end fixed hood.

DETAILED DESCRIPTION

The invention is further described in detail below with reference to the embodiments, but the protection scope of the invention is not limited thereto.

Figure 1:
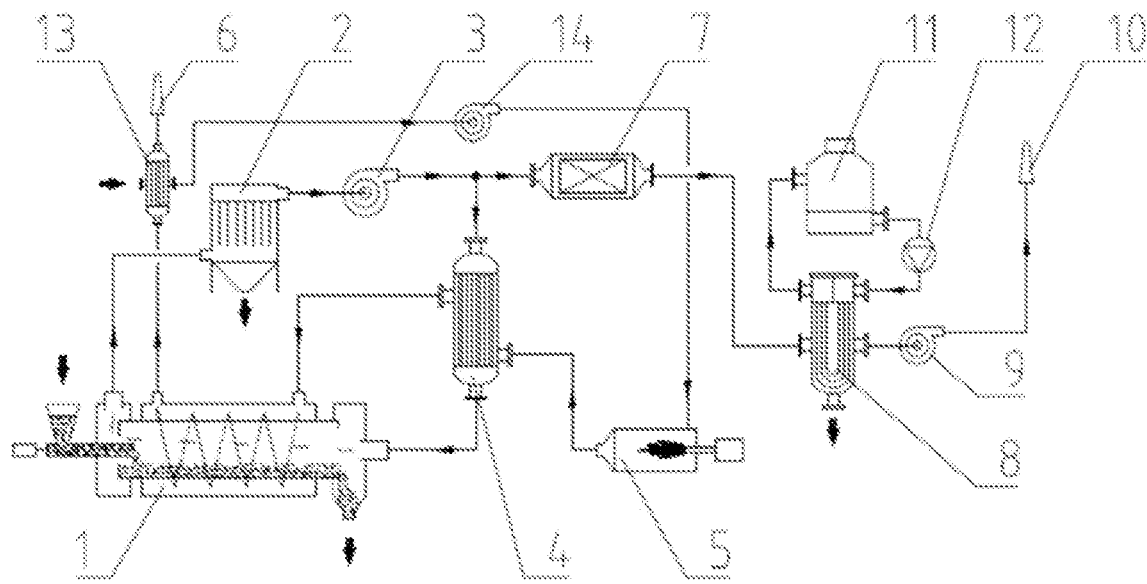
FIG. 1 is a flowchart of a hot air circulation type indirect thermal desorption-based soil remediation system.
Figure 2:
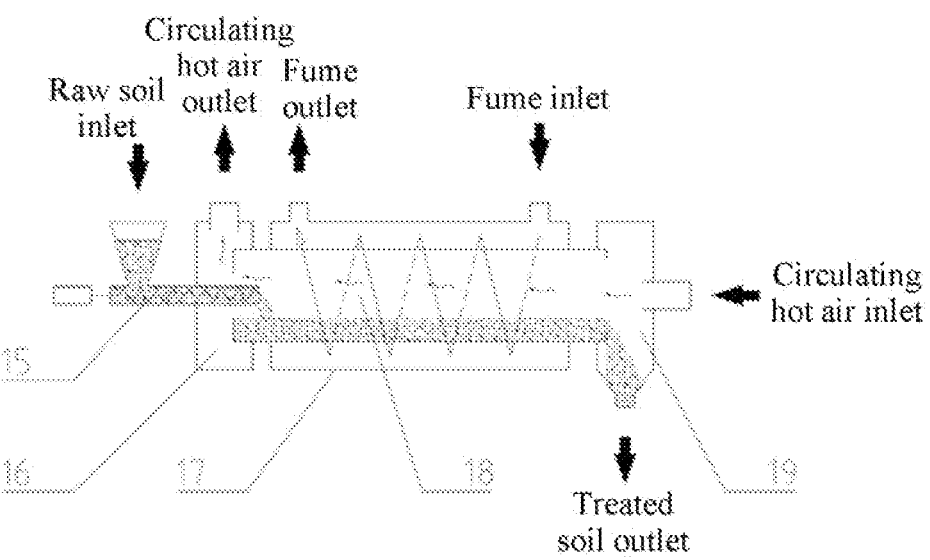
FIG. 2 is a schematic structural diagram of a thermal desorption reactor.

A hot air circulation type indirect thermal desorption-based soil remediation system is shown in FIGS. 1-2. The system includes a thermal desorption reactor 1. A drum 18 is disposed in an inner cavity of the thermal desorption reactor 1, and the thermal desorption reactor 1 is provided with two fume passages. One of the fume passages is a heating system inside the drum 18, and the system is composed of a circulating hot air outlet of the drum 18, a dust remover 2, a hot air circulating fan 3, a hot air heater 4 and a circulating hot air inlet of the drum 18 that are connected sequentially. The other fume passage is a heating system used outside the drum 18, and the system is composed of a fume outlet of the thermal desorption reactor 1, an air preheater 13, a combustion fan 14, a combustion device 5, the hot air heater 4 and a fume inlet of the thermal desorption reactor 1 that are connected sequentially.

An outer peripheral side of the drum 18 is provided with a heat insulation cover 17, one end of the drum 18 is provided with a feeding device 15, and the other end is provided with a discharge end fixed hood 19, and a feeding device 15 end of the drum 18 is sealed through a feed end fixed hood 16. The feeding device 15 is provided with a raw soil inlet, the feed end fixed hood 16 is provided with a circulating hot air outlet, the heat insulation cover 17 is provided with a fume inlet near a discharge end, and provided with a fume outlet near a feed end, and the discharge end fixed hood 19 is provided with a circulating hot air inlet and a treated soil outlet.

The hot air circulating fan 3 is further provided with an output end that is connected to a condenser 8 through a catalytic oxidation device 7, a cooling tower 11 and a circulating pump 12 are provided above the condenser 8, and a heat exchange process of the water in the condenser 8 and the cooling tower 11 is realized through the circulating pump 12.

An included angle between an axis of a drum body of the drum 18 and the horizontal plane is generally 0-6°, or there is a guide device leaning to the discharge end inside.

Embodiment 1

Structural dimensions and main technical parameters are as follows: the structures of devices are as described above. The drum in the reactor has a diameter of 2 m and a length of 12 m, a circulating air capacity is 16000 kg/h, and an amount of offgas to be purified is 4000 kg/h, that is, an amount of exhaust gas to be purified per ton of soil remediated is 200 kg. The combustion device has a natural gas consumption of 800 Nm$^3$/h. The complete system is divided into 4 skid mount units. The reactor constitutes 1 unit. The dust remover, the hot air circulating fan and the catalytic oxidation device constitute 1 unit. The combustion device, the combustion fan and the hot air heater constitute 1 unit. The condenser, the cooling tower, the circulating pump and the induced draft fan constitute 1 unit. Each unit is 13 m long×3 m wide×3 m high. The complete system is convenient for disassembly, assembly and transportation. 4 vehicle-times are required for the disassembly, assembly and transportation. The 4 units are arranged side by side, a spacing of 1.5 m is left therebetween as a maintenance and operation space, and a floor area of the system is 16.5 m×13 m=214.5 m².

The drum is made of 0Cr25Ni20, an included angle between the axis of the drum body and the horizontal plane is 1.5°, a rotating speed is 3 r/min, and a soil filling factor in the drum body is 0.2. The dust remover is a pulse-dust-cleaning high-temperature ceramic filter tube dust remover, a designed air capacity is 20000 Nm³/h, and a temperature resistance is >500° C. The hot air circulating fan has an air capacity of 50000 m³/h and a total pressure of 4000 Pa, and adopts variable frequency control. The hot air heater has a heat load of 4000 kw. The combustion device has an output of 8000 kw. The condenser has a heat load of 3000 kw. The induced draft fan has an air capacity of 10000 m³/h and a total pressure of 2000 Pa, and adopts variable frequency control.

The operating conditions are as follows: a soil bulk density is 1.3 t/m³, a water content is 20%, and contaminants are volatile/semi-volatile organic compounds. A thermal desorption method realized by using the above system includes:

(1) Thermal desorption offgas generated by contaminated soil being heated inside a drum 18 of a thermal desorption reactor 1 serves as an initial source of circulating hot air, the hot air flows to a dust remover 2 through a circulating hot air outlet of the drum 18 and is subjected to dust removal and driven by a hot air circulating fan 3, a part of the hot air is heated to 600° C. by a hot air heater 4 through indirect heat exchange, returns to the inside of the drum 18 through a circulating hot air inlet of the drum 18, transfers heat to the contaminated soil by direct countercurrent contact such that the temperature drops to 400° C., and carries the thermal desorption offgas generated by the contaminated soil being heated, a part continues to be recycled in a hot air circulation loop, and the remaining part is discharged after being purified.

(2) Fuel is combusted in a combustion device 5 to generate fume with a high temperature of 1000° C., and the fume is subjected to indirect heat exchange with the circulating hot air through the hot air heater 4 such that the temperature drops to 700° C., then enters a fume channel in the reactor through a fume inlet of a heat insulation cover 17, is subjected to indirect heat exchange with the contaminated soil in the drum 18 such that the temperature drops to 400° C., then flows to an air preheater 13 through a fume outlet of the heat insulation cover 17, is subjected to indirect heat exchange with room-temperature air such that the temperature drops to 200° C., and is finally discharged to the atmosphere through a chimney 6. The fume does not contact the soil and the circulating hot air.

(3) Room-temperature raw soil is fed into a feed end of the drum 18 by a feeding device 15, and is directly heated by the hot air inside the drum 18 and indirectly heated by the fume outside the drum 18 in the process of rotating along with the drum 18 and moving toward a discharge end such that the temperature gradually rises to 350° C., water and organic contaminants in the soil are volatilized into a gaseous state and carry dust to become the thermal desorption offgas that is separated from the solid soil, and the treated soil is discharged through a soil outlet of a discharge end fixed hood 19.

20% of the 400° C. gas in the drum passes through a catalytic oxidation device 7, the organic contaminants undergo thermal oxidation reaction at 380-420° C. to become carbon dioxide and water vapor, the mixture is subjected to indirect heat exchange with circulating cooling water through a condenser 8 so as to be cooled and condensed to 55-65° C., and driven by an induced draft fan 9, the mixture is finally discharged to the atmosphere through an exhaust funnel 10. The remaining 80% of the 400° C. gas serves as the circulating hot air.

The room-temperature air passing through the air preheater 13 is subjected to indirect heat exchange with the fume at the fume outlet of the heat insulation cover 17 such that the temperature rises to 150-250° C., and is driven by a combustion fan 14 to the combustion device 5 to serve as combustion-supporting air for the combustion of the fuel, thereby realizing reuse of waste heat.

Clean water, serving as circulating water, is subjected to indirect heat exchange with the offgas at an outlet of the catalytic oxidation device 7 through the condenser 8 such that the circulating water is heated to 40-60° C., and then the circulating water is cooled to about 35° C. by a cooling tower 11 and driven by a circulating pump 12 to be recycled.

The effects that have been realized are as follows: 20 tons of contaminated soil per hour is remediated, a mean consumption of natural gas per ton of contaminated soil remediated is 40 Nm³, and a removal rate of the organic contaminants is 99% or above.

Comparative Example 1

Structural dimensions and main technical parameters are as follows: solutions recorded in specific implementations in the continuous method for direct thermal desorption of persistent organic contaminated soil disclosed in Application No. CN201110201582.6 are used. The rotary thermal desorber has a diameter of 2 m and a length of 12 m. Fuel consumptions of the combustor in the rotary kiln and the combustor in the secondary combustion chamber are added together and converted into the natural gas consumption which is 1500 Nm³/h. The amount of high-temperature fume generated by combustion is 20500 kg/h, the amount of thermal desorption gas generated by the soil being heated is 4000 kg/h, and the total amount of exhaust gas to be purified is 24500 kg/h, that is, the amount of exhaust gas to be purified per ton of soil remediated is 1225 kg. The complete system is divided into about 10 units, and each unit is 13 m long×3 m wide×3 m high, that is, 10 vehicle-times are required for the disassembly, assembly and transportation. Considering the maintenance and operation space, a floor area of the system is 30 m×17.5 m=525 m².

The operating conditions are as follows: a soil bulk density is 1.3 t/m³, a water content is 20%, and contaminants are volatile/semi-volatile organic compounds.

The temperature setting is as follows: the high-temperature fume at 600° C. generated by combustion is subjected to indirect heat exchange with the soil through the rotary kiln such that the temperature drops to 400° C. Then the fume is mixed with the thermal desorption gas generated by the soil being heated, and the mixture enters the secondary combustion chamber, is heated for a second time to 1200° C., and resides for not less than 2 s so as to be pyrolyzed and combusted sufficiently. Then, the product is discharged through an induced draft fan and a chimney after deacidification, cooling and dust removal. The initial temperature of the contaminated soil is room temperature (20° C.), and the temperature after heating is 350° C.

The effects that have been realized are as follows: 20 tons of contaminated soil per hour is remediated, a mean consumption of natural gas per ton of contaminated soil remediated is 75 Nm³, and a removal rate of the organic contaminants is 99% or above.

Comparative Example 2

Structural dimensions and main technical parameters are as follows: solutions recorded in specific implementations in the indirect thermal desorption device for organic contaminated soil remediation disclosed in Application No. CN201821545107.4 are used. The drum body of the indirect thermal desorption machine has a diameter of 2 m and a length of 12 m. The natural gas consumption of the combustion furnace is 140 Nm³/h, and the amount of thermal desorption gas generated by the soil being heated is 700 kg/h, that is, the amount of exhaust gas to be purified per ton of soil remediated is 200 kg. The complete system is divided into about 4 units, namely a thermal desorption subsystem, a combustion furnace subsystem, an exhaust gas purifying subsystem and a circulating water cooling subsystem, and each unit is 13 m long×3 m wide×3 m high, that is, 4 vehicle-times are required for the disassembly, assembly and transportation. Considering the maintenance and operation space, a floor area of the system is 16.5 m×13 m=214.5 m².

The operating conditions are as follows: a soil bulk density is 1.3 t/m³, a water content is 20%, and contaminants are volatile/semi-volatile organic compounds.

The temperature setting is as follows: the high-temperature fume at 800° C. generated by combustion is subjected to indirect heat exchange with the soil through the indirect thermal desorption machine such that the temperature drops to 400° C., and is finally discharged through a chimney. The initial temperature of the contaminated soil is room temperature (20° C.), and the temperature after heating is 350° C.

The effects that have been realized are as follows: 3.5 tons of contaminated soil per hour is remediated, a mean consumption of natural gas per ton of contaminated soil remediated is 40 Nm³, and a removal rate of the organic contaminants is 99% or above.

Comparison Results
Treatment Effects of Embodiment and Comparative Examples source of circulating hot air, the hot air flowing to a dust remover through a circulating hot air outlet of the drum, subjecting the hot air to dust removal and driving the hot air by a hot air circulating fan, heating a part of the hot air to 550-650° C. by a hot air heater through indirect heat exchange, returning to the inside of the drum through a circulating hot air inlet of the drum, transferring heat to the contaminated soil by direct countercurrent contact such that the temperature drops to 380-420° C., and carrying the thermal desorption offgas generated by the contaminated soil being heated, wherein a part continues to be recycled in a hot air circulation loop, and a remaining part is discharged after being purified;

combusting fuel in a combustion device to generate fume with a high temperature of 950-1050° C., and subjecting the fume to indirect heat exchange with the circulating hot air through the hot air heater such that the temperature drops to 700-800° C., the fume then entering a fume channel in the reactor through a fume inlet of a heat insulation cover, being subjected to indirect heat exchange with the contaminated soil in the drum such that the temperature drops to about 350-450° C., then flowing to an air preheater through a fume outlet of the heat insulation cover, being subjected to indirect heat exchange with room-temperature air such that the temperature drops to 150-250° C., and being finally discharged to the atmosphere through a chimney, wherein the fume does not contact the soil and the circulating hot air; and feeding room-temperature raw soil into a feed end of the drum by a feeding device, directly heating the room-temperature raw soil by the hot air inside the drum and indirectly heating the room-temperature raw soil by the fume outside the drum in the process of rotating along with the drum and moving toward a discharge end such that the temperature gradually rises to about 300-500° C., volatizing water and organic contaminants in the soil into a gaseous state and carrying dust to become the thermal desorption offgas that is separated from the solid soil, and discharging the treated soil through a soil outlet of a discharge end fixed hood.

| Item | Embodiment 1 | Comparative Example 1 | Comparative Example 2 |
|---|---|---|---|
| Contaminated soil remediated per hour | 20 tons | 20 tons | 3.5 tons |
| Soil temperature after heating | 350° C. | 350° C. | 350° C. |
| Removal rate of organic contaminants | >99% | >99% | >99% |
| Mean consumption of natural gas per ton of contaminated soil remediated | 40 Nm³ | 75 Nm³ | 40 Nm³ |
| Amount of exhaust gas to be purified per ton of soil remediated (converted) | 200 kg | 1225 kg | 200 kg |
| Demand for vehicles for disassembly, assembly and transportation of system | 4 vehicle-times | 10 vehicle-times | 4 vehicle-times |
| System floor area | 214.5 m² | 525 m² | 214.5 m² |

What is claimed is:

1. A hot air circulation type indirect thermal desorption-based soil remediation method, the method comprising:
generating thermal desorption offgas by heating contaminated soil inside a drum of a thermal desorption reactor, the thermal desorption offgas serving as an initial 2. The hot air circulation type indirect thermal desorption-based soil remediation method according to claim 1, wherein the method further comprises passing the remaining part of the circulating hot air from an outlet of the hot air circulating fan through a catalytic oxidation device, the organic contaminants undergo thermal oxidation reaction at 380-420° C. to become carbon dioxide and water vapor, subjecting the mixture to indirect heat exchange with circulating cooling water through a condenser so as to be cooled and condensed to 55-65° C., and driven by an induced draft fan, and is finally discharging the mixture to the atmosphere through an exhaust funnel.

3. The hot air circulation type indirect thermal desorption-based soil remediation method according to claim 1, further comprising subjecting the room-temperature air passing through the air preheater to indirect heat exchange with the fume at the fume outlet of the heat insulation cover such that the temperature rises to 150-250° C., and driving the room-temperature air by a combustion fan to the combustion device to serve as combustion-supporting air for the combustion of the fuel, thereby realizing reuse of waste heat.

4. The hot air circulation type indirect thermal desorption-based soil remediation method according to claim 1, further comprising subjecting clean water, serving as circulating water, to indirect heat exchange with the offgas at an outlet of the catalytic oxidation device through the condenser such that the circulating water is heated to 40-60° C., and then cooling the circulating water to about 35° C. by a cooling tower and driving the circulating water by a circulating pump to be recycled.

5. The hot air circulation type indirect thermal desorption-based soil remediation method according to claim 1, wherein a rotating speed of the drum body is 0.4-10 r/min, and a soil filling factor in the drum body does not exceed 0.25.

6. The hot air circulation type indirect thermal desorption-based soil remediation method according to claim 1, further comprising continuously generating the thermal desorption offgas with the continuous treatment of the soil, wherein the circulating hot air carries the thermal desorption offgas and is mixed therewith, the amount of gas, 65-90% of the gas in the drum serving as the circulating hot air is recycled in a first fume passage, and the remaining gas enters the catalytic oxidation device and the condenser through a branch of the outlet of the hot air circulating fan and is discharged after being purified.

7. A hot air circulation type indirect thermal desorption-based soil remediation system realized by using the method according to claim 1, wherein the system comprises:
a thermal desorption reactor;
a drum is-disposed in an inner cavity of the thermal desorption reactor, wherein:
the thermal desorption reactor is provided with two fume passages,
the first fume passage is a heating system inside the drum,
the system is composed of a circulating hot air outlet of the drum, a dust remover, a hot air circulating fan, a hot air heater and a circulating hot air inlet of the drum that are connected sequentially, and
the second fume passage is a heating system used outside the drum, and the system is composed of a fume outlet of the thermal desorption reactor, an air preheater, a combustion fan, a combustion device, the hot air heater and a fume inlet of the thermal desorption reactor that are connected sequentially.

8. The hot air circulation type indirect thermal desorption-based soil remediation system according to claim 7, wherein an outer peripheral side of the drum is provided with a heat insulation cover, one end of the drum is provided with a feed end fixed hood and a feeding device, and the other end is provided with a discharge end fixed hood, and
wherein the feeding device is provided with a raw soil inlet, the feed end fixed hood is provided with a circulating hot air outlet, the heat insulation cover is provided with a fume inlet near a discharge end, and provided with a fume outlet near a feed end, and the discharge end fixed hood is provided with a circulating hot air inlet and a treated soil outlet.

9. The hot air circulation type indirect thermal desorption-based soil remediation system according to claim 7, wherein the hot air circulating fan is further provided with an output end that is connected to a condenser through a catalytic oxidation device, a cooling tower and a circulating pump are provided above the condenser, and a heat exchange process of the water in the condenser and the cooling tower is realized through the circulating pump.

10. The hot air circulation type indirect thermal desorption-based soil remediation system according to claim 7, wherein an included angle between an axis of a drum body of the drum and the horizontal plane is generally 0-6°, or there is a guide device leaning to the discharge end inside.

* * * * *